Figure 5:
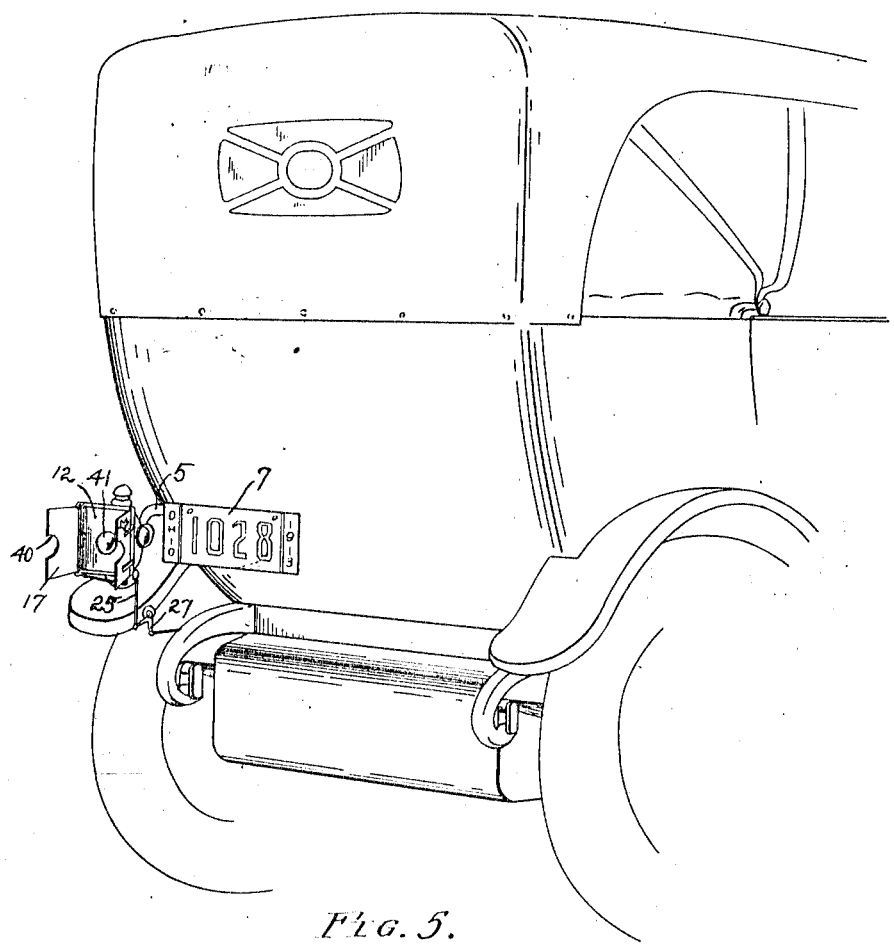

F. J. ERNEY.
SIGNALING DEVICE FOR AUTOMOBILES.
APPLICATION FILED JUNE 16, 1913.
1,105,637.
Patented Aug. 4, 1914.
2 SHEETS—SHEET 1.
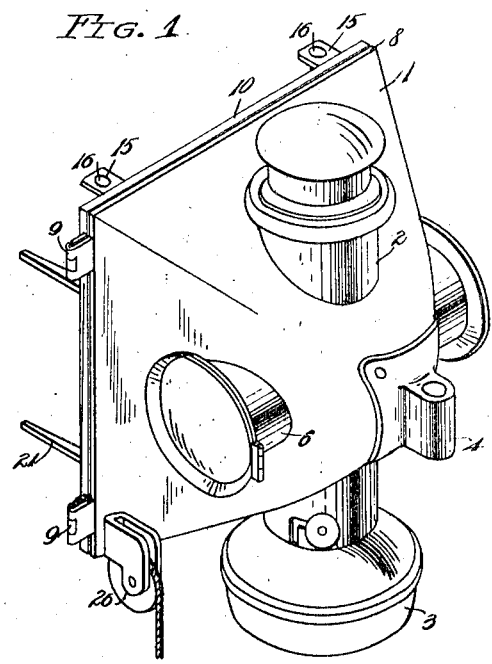
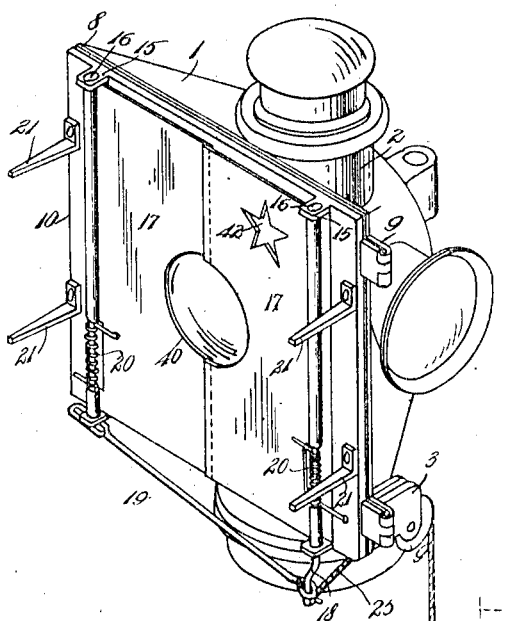
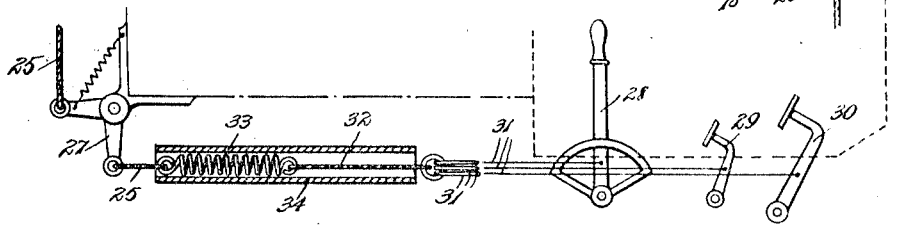
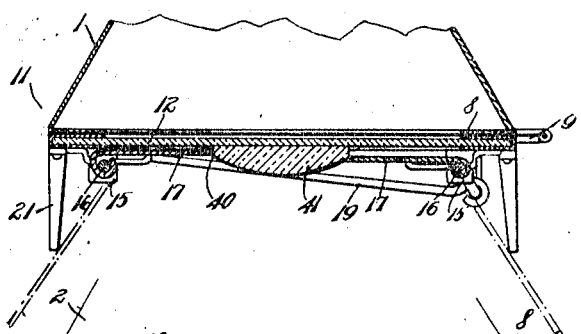
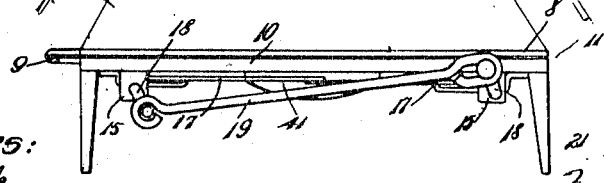
WITNESSES:
R. L. Bruck.
Hugh B. McGill
INVENTOR.
Frank J. Erney
By Hull & Smith
ATTYS.

F. J. ERNEY.
SIGNALING DEVICE FOR AUTOMOBILES.
APPLICATION FILED JUNE 16, 1913.

1,105,637.

Patented Aug. 4, 1914.
2 SHEETS—SHEET 2.

WITNESSES:
R. L. Bruck
Hugh B. McGill

INVENTOR.
Frank J. Erney
By Hull & Smith
ATTY'S.

UNITED STATES PATENT OFFICE.

FRANK J. ERNEY, OF CLEVELAND, OHIO.

SIGNALING DEVICE FOR AUTOMOBILES.

1,105,637.

Specification of Letters Patent.   Patented Aug. 4, 1914.

Application filed June 16, 1913.   Serial No. 773,866.

*To all whom it may concern:*

Be it known that I, FRANK J. ERNEY, a citizen of the United States, residing at Cleveland, in the county of Cuyahoga and State of Ohio, have invented a certain new and useful Improvement in Signaling Devices for Automobiles, of which the following is a full, clear, and exact description, reference being had to the accompanying drawings.

This invention relates to signaling devices and particularly to a combined tail lamp and signaling lamp for use upon automobiles and arranged so as at all times to perform the ordinary functions of a tail lamp as well as illuminating the number plate if desired, and in addition, may be actuated to inform persons in other vehicles of the intentions of the automobile driver thereby reducing the likelihood of collision.

It is the custom of certain intelligent and careful operators to give notice to following vehicles of their intention to stop suddenly or to make other changes in the driving of their cars so that rear end collisions may be avoided. Inasmuch as these signals are generally given by certain well understood movements of the hands and arms they are objectionable even in the day time by reason of the necessity of giving particular thought thereto and requiring the removal of the hand from the operative parts of the mechanism, while at night such signals are useless because invisible.

It is the object of this invention to provide signaling devices which shall be operable independently of any specific intention on the part of the operator and which shall not require the actuation of any other levers or controlling devices than those ordinarily present; the provision of a signaling device which either by day or by night and particularly by night, shall be readily apparent and shall be immediately understood as a signal; the provision of a combined lamp which shall serve the purposes of the ordinary tail lamp and shall also be equipped with devices whereby the character of the light given thereby may be altered upon changes in the control of the machine; while further objects and advantages will become apparent as the description proceeds.

In the drawings accompanying and forming a part of this application I have illustrated one form of lamp in which my invention can be embodied and one form of mechanism whereby the same may be operated in connection with automobile controlling mechanism, although it is understood that this construction is only one of many which could be adopted for the end in view.

In these drawings Figure 1 is a perspective view of the rearward side of my improved signal lamp together with a diagram illustrating one mode of connecting the same to the control levers of the automobile; Fig. 2 is another perspective view of the same lamp showing the face side thereof; Fig. 3 is a transverse, cross sectional view of a portion of the lamp taken upon a central horizontal plane looking downwardly; Fig. 4 is a bottom plan view of the signal lamp; and Fig. 5 shows my invention applied to an automobile.

Describing the parts by reference characters, 1 represents the casing of my improved signal lamp, 2 the chimney, 3 the fuel reservoir, and 4 the supporting gear whereby it may be secured to the bracket 5 ordinarily provided in an automobile for such purpose. Inasmuch as the ordinary tail lamp carried by an automobile shows a circular light I desire to show as a signal a square or rectangular light-beam the better to attract attention, wherefore I preferably form the casing of pyramidal form having a substantially square base as shown. The base of said pyramid is presented in the direction the light is to be thrown and the apex of the pyramid is preferably rounded off in two directions upon parabolic curves, the light source being located at the common focus of these parabolas. This arrangement causes the entire aperture of the casing to be illuminated with substantial uniformity and brings out clearly the rectangular character of the light beam. The vertical faces of the casing are also preferably formed with laterally projecting hollow bosses 6—6 adapted for the reception of glass bull's-eyes whereby a lateral light can be thrown, one of those bull's-eyes being ordinarily of white glass to permit the illumination of the license number 7 as in the usual case, and the opposite boss being provided with a green lens in accordance with the usual practice, although it is obvious that these glasses could be interchanged in case the position of the tail lamp and bracket were reversed, or that both lenses could be either plain or colored in case this lamp should be made separate from the usual tail lamp. To the open base of this pyramidal casing I secure a stiffening frame 8 to which I attach by means of hinges 9—9 a rectangular frame 10, the free edge of which is secured to the lamp casing by means of any suitable latch (not shown). The frame 10 is preferably made of U-shape as illustrated in Fig. 3 for the reception of the glass sheet 12 whereby the open side of the lamp-casing is closed.

Carried by the outer face of the frame 10 at each side of the opening therein is a pair of apertured ears 15, here shown as integral therewith, vertically alined ears having their apertures in alinement and receiving rock shafts 16 to which are secured the rigid metallic leaves or shutters 17—17, which when closed overlap slightly at the center of the frame as shown in Figs. 2 and 4. The ends of the shafts 16—16 may be bent to form cranks 18—18 as shown in Figs. 2 and 4 and these cranks are preferably connected by means of a link 19 so that the shutters will be operated simultaneously. Wire springs 20—20 may, if desired, be associated with the shutters so as normally to hold the same in closed position, and rigid arms 21—21 are preferably carried by the frame to limit the opening movement of the shutters.

For the operation of the shutters I provide a suitable tension member 25 such as a chain, wire, rod, or cord connected to one of the cranks 18, a pulley 26 being preferably provided at the corner of the lamp casing so that this chain may connect with the crank at the proper angle. Any changes in direction of this tension member can be effected either by pulleys or by bell-crank levers 27 in a well known manner.

At 28 I have illustrated the brake lever together with its sector, at 29 the clutch pedal and at 30 a separate pedal solely for the operation of the signal lamp. Wires or other tension members 31—31 lead from these various devices to a common tension member 32 which is connected to the member 25 by means of a tension spring 33, the latter being, if desired, supported in a sleeve 34. This spring connection permits the operation of the signaling shutters immediately upon the inception of movement of any of the devices 28, 29 or 30 and without hindering the further movement of these devices to the extent necessary for the operation or control of the car.

Inasmuch as it will be desirable in many cases to employ this lamp as a tail lamp and so obviate the necessity of employing a totally distinct light source I have devised a construction which shall permit the constant exhibition of the light at the rear end of the vehicle as required by most city ordinances and at the same time to effect the changing of the character of that light upon occasion so as to call the attention of following drivers irresistibly to the same and indicate that a signal is being given. In the preferred construction this is effected by cutting away a semi-circular portion of each of the shutters 17—17, as shown at 40, so as to permit the light to shine forth, and preferably I secure against the face of the glass 12 at this point a bull's-eye 41 which shall render still more apparent the circular character of this opening and prevent the flame itself being visible. Then upon the opening of the shutters 17—17 the circular character of the light will disappear and a square light-beam be thrown. Ordinarily both lights will be red, which may be effected by employing red glass for the sheet 12, the bull's-eye 41 being of white glass cemented to the face of this sheet. However, this arrangement can obviously be reversed, the sheet 12 being of plain glass and the bull's-eye 41 of red glass, whereupon the light beam will be changed not only in shape but also in color upon the operation of the shutters, and my invention and the terms of the claims hereto annexed are esteemed to extend to and cover both of these expedients. In fact where I have employed the expression "change in character" I esteem it to mean any change in the shape, color, intensity, position, or appearance of the light such as may be available to attract attention and indicate a meaning. Ordinarily when this lamp is used as a tail lamp the light given thereby during the normal operation of the car will necessarily be red to conform to the ordinance requirements of the different cities. In case it be desired to distinguish this lamp from the ordinary tail lamp even when the same is not being used as a signal so as to call the attention of people thereto and induce them to expect to receive signals therefrom, I may provide one or more of the shutters with one or more apertures of some characteristic shape such as the star shaped aperture illustrated at 42 in Fig. 2. This arrangement also suggests the employment of two or more separate apertures in the shutters which merges into one upon the opening of the shutters, which is one of the modes of securing a change in the character of the light.

The arms 21—21 are preferably arranged so as to limit the opening movement of the shutters to an angle of between 105° and 120° and the inner faces of the shutters are preferably of a bright red or orange color so as to attract attention in the daytime as well as at night. This renders it desirable to open the shutters more than 90° and preferably not less than 105°, while the difficulty of swinging the shutters rapidly through a wider arc than 120° or thereabout sets a practical upper limit to the movement.

While it is frequently desirable, as above explained, to effect the operation of this signal simultaneously with the operation of the automobile and without giving the same especial consideration it may sometimes be desirable to operate the same independently of such control wherefore I have suggested an independent pedal 30. Also, while I have shown an oil-burning lamp as being the type most likely to be used as a tail lamp, it is obvious that any suitable light source may be employed. Also while I have shown exterior opaque shutters for changing the character and intensity of the light it is obvious that many other expedients could be adopted for effecting these changes. In general it will be obvious that a great many variations in matters of detail could be made without departing from the scope of my invention or serious detriment to the advantages derived therefrom. Accordingly I esteem my invention to comprise all modifications and re-arrangements so far as comprised within the annexed claims.

Having thus described my invention what I claim is:—

1. In a device of the character described, the combination, with a casing of opaque material having a window opening in its side and a pane of translucent material covering said window opening, of one or more shutters of opaque material carried by said casing, and means for moving said shutter or shutters into and out of obstructing position as regards said opening, said shutter or shutters having an aperture therein of different shape and smaller size than said window opening, and the part of said pane with which said aperture registers being of a different color than the remainder of said pane.

2. In a device of the character described, the combination, with a casing of opaque material having a rectangular opening and a pane of translucent material covering said opening, of one or more shutters of opaque material carried by said casing, and means for moving said shutter or shutters into and out of obstructing position as regards said opening, said shutter or shutters having an aperture therein, and the part of said pane opposite said shutter aperture being colored, the remainder of said pane being of a different color.

3. A signal lamp for vehicles, comprising, in combination, a casing of opaque material having a rectangular opening in its side, a pane of transparent material covering said opening, shutters hinged to said casing at opposite sides of said opening, said shutters having their free edges notched so as to provide an aperture when said shutters are closed, means normally holding said shutters in closed position, and means connected to said shutters for opening the same to change the character of the light beam.

4. A signaling device for automobiles, comprising, in combination, a supporting device adapted to be secured to an automobile, a member of opaque material pivoted to said supporting device, the axis of said pivot lying in the plane which is perpendicular to the longitudinal axis of the vehicle, a lamp or burner carried by said supporting device, at the forward side of said member, and means for swinging said member about its axis so as alternately to disclose said light source from the rear of the vehicle and to obstruct the same, the face of said member which is presented toward the light source when in obstructing position being of a bright color and the opposite face being of a dark or neutral color and the angle of rotation of said member being sufficient to display said bright colored face to the rear of the vehicle when said member is moved to unobstructing position.

5. A signaling device for automobiles, comprising, in combination, a casing adapted to be secured to an automobile and having a rearwardly facing window, a lamp or burner within said casing and adapted when lighted, to illuminate said window, an opaque shutter mounted upon a substantially vertical pivot at each side of said window, means for rotating said shutters about their pivots so as alternately to obstruct and to uncover said window, the angle of rotation of said shutters being greater than 90° and the inner faces of said shutters being of a different color than the outer faces thereof so as to render visible the movement of the same in the daytime.

6. In a tail-lamp for automobiles, in combination, a casing of opaque materials having a rearwardly exposed face formed with a rectangular opening, a light source in said casing, a translucent pane in said opening, a circular lens carried by one face of said pane, a pair of shutters pivoted to said casing at opposite sides of said opening and adapted when closed to meet at their edges, the free edges of said shutters being formed with semicircular notches adapted to register with said lens when said shutters are closed, and means for swinging said shutters simultaneously about their pivots so as to cover and uncover said opening.

7. In a tail-lamp for automobiles, in combination, a casing of opaque materials having a rearwardly exposed face formed with a rectangular opening, a light source in said casing, a translucent pane in said opening, a circular lens carried by one face of said pane, a pair of shutters pivoted to said casing at opposite sides of said opening and adapted when closed to meet at their edges, the free edges of said shutters being formed with semicircular notches adapted to register with said lens when said shutters are closed, reflecting surfaces carried by said casing at the side of said light opposite said opening and adapted to illuminate the whole of said pane with substantial uniformity, and means for swinging said shutters simultaneously about their pivots so as when closed to disclose a circular light-spot and when opened to permit the emission of a rectangular light beam.

In testimony whereof, I hereunto affix my signature in the presence of two witnesses.

FRANK J. ERNEY.

Witnesses:
BRENNAN B. WEST,
C. O. BULOCK.